United States Patent

[11] 3,599,395

[72] Inventors Joseph Rodriguez
 Long Pond, Pa. 18334;
 Rafael R. Rodriguez, Long Pond, Pa. 18334; Rafael Rodriguez, R.D. #5, Shavertown, Pa. 18708;
 Herman R. Fry, Box 257, R.D. #5, Shavertown, Pa. 18708
[21] Appl. No. 830,804
[22] Filed June 5, 1969
[45] Patented Aug. 17, 1971
[73] Assignee Joseph Rodriguez, Rafael R. Rodriguez, Rafael Rodriguez, by said Fry

[54] CROP-HARVESTING AID
 6 Claims, 4 Drawing Figs.
[52] U.S. Cl. .................................................. 53/391
[51] Int. Cl. ............................................. B65b 76/02
[50] Field of Search ........................................ 53/391

[56] References Cited
UNITED STATES PATENTS

| | | | |
|---|---|---|---|
| 2,321,387 | 6/1943 | Jackson | 53/391 |
| 2,337,615 | 12/1943 | McLaren | 53/391 X |
| 2,473,587 | 6/1949 | Huston | 53/391 |
| 2,647,525 | 8/1953 | Duda et al. | 53/391 X |
| 2,699,877 | 1/1955 | Huston | 53/391 X |

Primary Examiner—Theron E. Condon
Assistant Examiner—E. F. Desmond
Attorneys—John W. Behringer, Eugene L. Bernard, Martin J. Brown, James N. Dresser, W. Brown Morton, Jr., John T. Roberts and Malcolm L. Sutherland ABSTRACT: A tractor-drawn harvesting aid particularly suited for use in the harvesting of crops such as cabbage, cauliflower and head lettuce. The crops are cut by hand and placed upon a conveyor which brings them to an elevator. The elevator deposits the crops at a packing station which is supplied with containers by a second conveyor. The elevator buckets are staggered, and the packing station includes a movable divider so that the crops are distributed between two work areas of the packing station in accordance with the packing speed of the crews at those two work areas. The packed containers are moved to a closing station and then to a storage location.

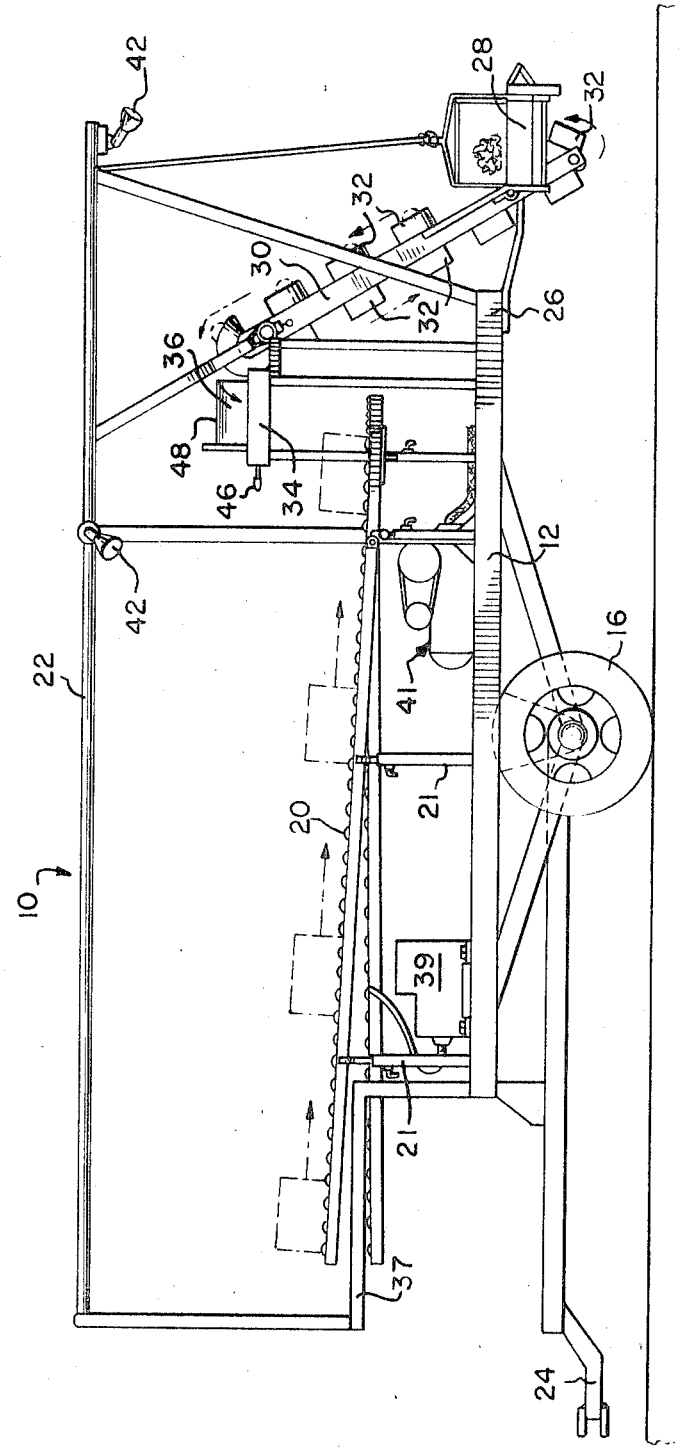

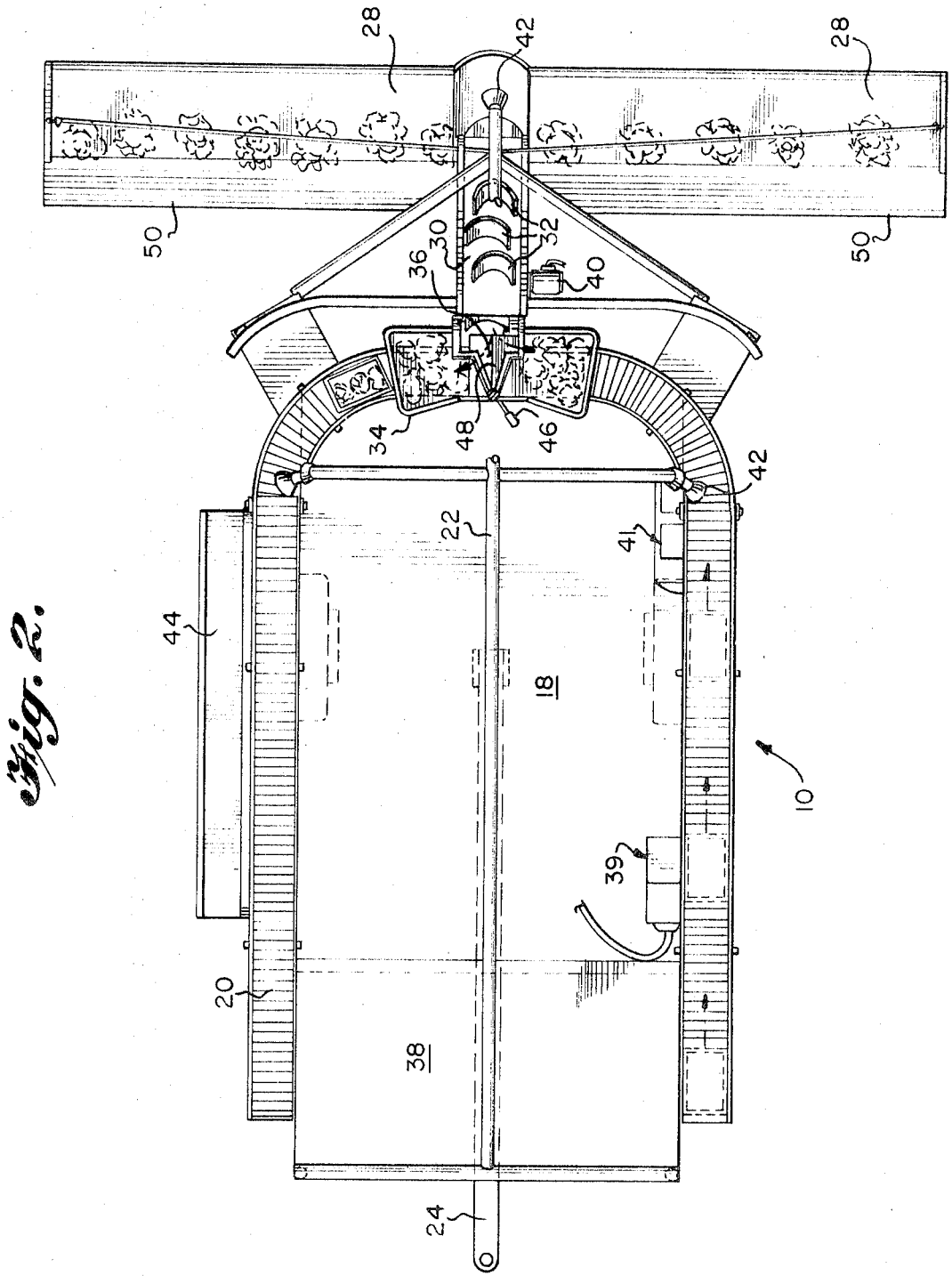

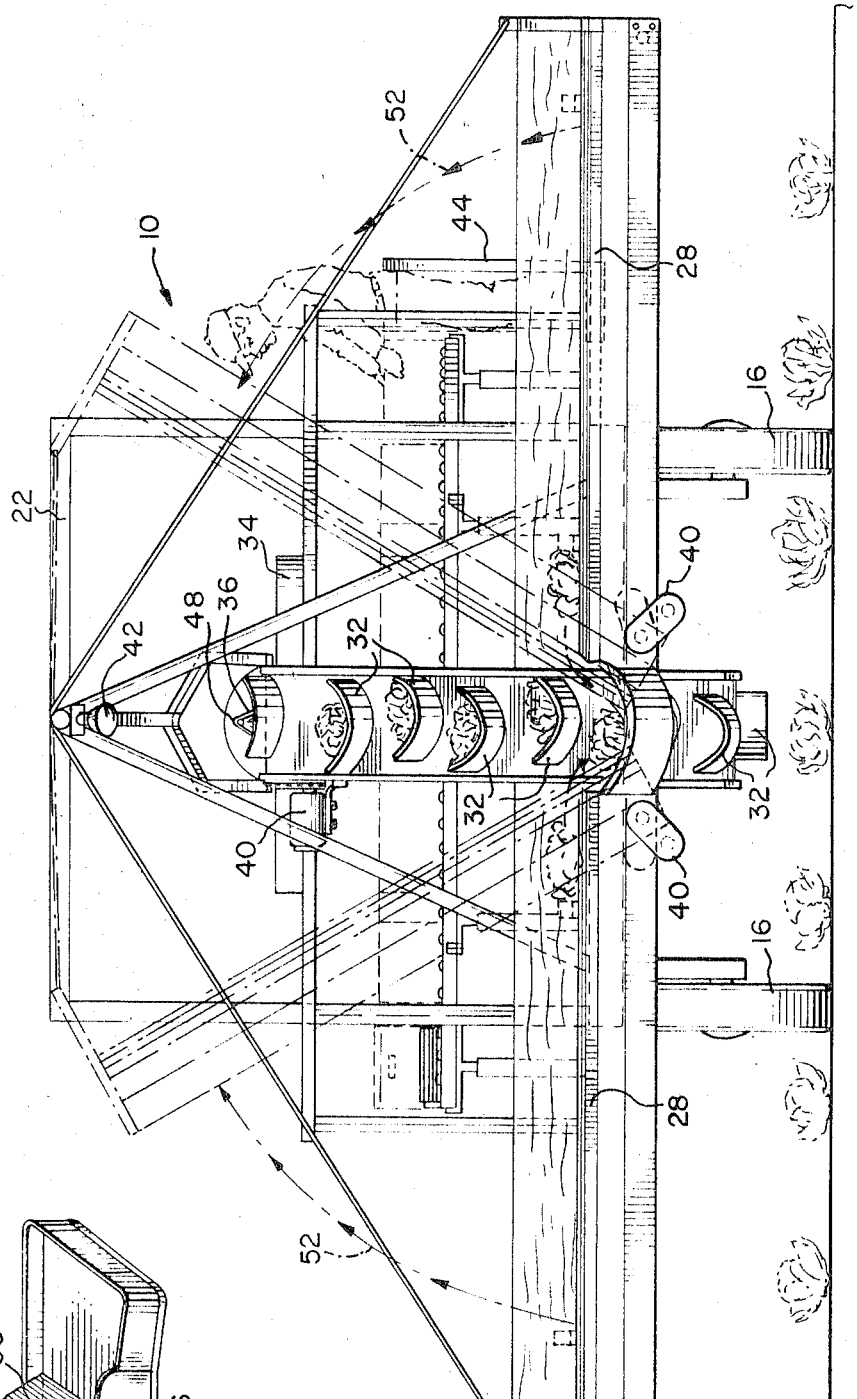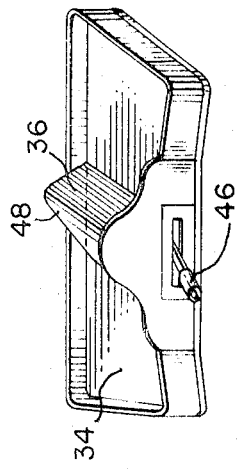
INVENTORS
JOSEPH RODRIGUEZ,
RAFAEL R. RODRIGUEZ,
RAFAEL RODRIGUEZ &
HERMAN R. FRY
BY *McLean, Morton & Boustead*
ATTORNEYS

CROP-HARVESTING AID

The present invention pertains to a crop-harvesting aid. More particularly, the present invention pertains to an apparatus for use in the harvesting of crops such as cabbage, head lettuce, cauliflower, cantalopes and other such produce.

Where crop quality is not of highest importance, the mechanical harvesting of crops such as cabbage, cauliflower and other produce is relied upon for speed and efficiency. Even in the same field, crops reach their harvesting point at varying times. Consequently, if a field is harvested all at one time, some of the crop is harvested prematurely, while some may be past its peak. This mechanical harvesting is utilized where a less-than-optimum grade of produce is acceptable, for example, where the crops are to be sold by the ton for canning or freezing. To obtain the highest profit per acre of crop, the crops must be sold on the fresh produce market, thereby commanding premium prices. To attain the highest yield of top quality crops for this fresh produce market, it is necessary that the crops be picked by hand and carefully packed to avoid bruising and other crop damage.

At present, crops for the fresh produce market are harvested in one of two basic manners. Using centralized packing, the crops are cut and packed in the field in temporary containers for movement to a central packing area at which grading, packing and loading takes place. This requires that the labor be properly divided between the harvesting area and the packing area. Having the labor divided into two locations makes the management of the operation more difficult. If a proper balance is not maintained between the crew sizes at these two areas, one crew must periodically stop work to wait for the other to catch up. The extra handling results in more bruising of the crop than otherwise would occur, resulting in additional crop losses. Furthermore, the extra handling and movement of the crops are time consuming and costly.

In field packing, containers are distributed throughout a field, and the crew moves through the field cutting the crop and packing these previously distributed containers on the ground. Often either too many or too few containers are distributed. Packing of the containers on the ground causes discomfort for the crew. Once the containers are packed, they must be hand loaded from the ground to a vehicle. This necessitates the lifting of the heavy packed containers a considerable height. To improve upon this, conveyor belts are sometimes utilized so that when the crops are cut they are placed on a conveyor belt to move the crop to packing equipment. The conveying and packing equipment, however, is so large that it can not be conveniently moved through the field, particularly during extremely wet conditions.

The present invention is a crop-harvesting aid which permits the field packing of the freshly harvested crops by a small crew. The apparatus is tractor-drawn and includes means for receiving freshly cut crops, means for moving these received crops to a centralized packing station, means for providing the packing station with empty containers and means for moving filled containers to a storage location. The entire apparatus can be drawn through the field by a small farm tractor. Since the entire crew works in a small area, this area can be lit by means of flood lights to permit night harvesting if desired. In addition, a cover can be placed over the entire apparatus to provide protection from rain and hot sun. The light weight of the apparatus permits repeated harvesting of a field with a minimum amount of compacting of the soil. Consequently, a field can be covered several times so that each plant can be harvested at its peak condition. The apparatus readily assumes a compact size for transportation over public roadways.

These and other aspects and advantages of the present invention are more apparent in the following detailed description and claims, particularly when considered in conjunction with the accompanying drawings. In the drawings:

FIG. 1 is a side elevational view of a preferred embodiment of the apparatus of the present invention;

FIG. 2 is a partially broken plan view of the apparatus of FIG. 1;

FIG. 3 is an end elevational view of the apparatus of the present invention; and FIG. 4 is a perspective view of one component of the present invention.

As seen in the drawings, the harvesting aid 10 includes a frame having left and right lower side members 12, from each of which is independently suspended a wheel 16. Support surface 18 is supported by lower side members 12 and provides a surface for personnel and the storage of material. At a convenient height above surface 18, for example a height in the order of 2 feet, there is located a roller conveyor 20 having a generally horseshoe shape. Preferably conveyor 20 is sloped downwardly along its path of travel so that containers placed thereon might be easily moved with the aid of gravity, as depicted in FIG. 1. If the support columns 21 of conveyor 20 are telescopically adjustable, then either end can be raised or lowered to permit selection of the direction of container flow. Supported above conveyor 20 at a height of for example 7 feet above surface 18 is upper frame 22.

The front end of harvesting aid 10 includes a drawbar 24 which permits attachment of harvesting aid 10 to a standard farm tractor. Attached to the rear end 26 of harvesting aid 10 is a belt conveyor including two conveyor sections 28, one extending from a location near the center of end 26 outwardly beyond each side of harvesting aid 10. Between the two conveyors 28 is located elevator 30 which, for example, might be an electrical endless belt of rubberized material having a plurality of buckets 32 attached thereto. At the upper end of elevator 30 and over the horseshoe formed by conveyor 20 is located packing platform 34 which, for example, might be at a height in the order of 4 feet above surface 18.

As seen in FIGS. 2 and 4, the center of packing platform 34 at the discharge point of elevator 30 includes a separator 36 which, for example, might be a vertical metal frame having rubberized belt material over it.

The terminal ends of conveyor 20 are adjacent an extension 37 of harvesting aid 10 which hangs forwardly over drawbar 24 and provides a work or storage platform 38 at about the same height as conveyor 20. A gasoline motor-driven generator 39 and an air compressor 41 are provided on surface 18. Generator 39 provides electrical power for motors 40 which drive elevator 30 and belt conveyors 28. In addition, generator 39 can be utilized to energize lights 42 during night operations and to provide power for auxiliary equipment such as a grinding wheel, a coffeepot, etc. The air compressor 41 provides air for a staple gun or nail gun, desired. Along the side of harvesting aid 10, adjacent the lower discharge terminal of conveyor 20, is located a telescoping platform 44. Platform 44 has a support surface parallel with surface 18 and a back support. When not in use, platform 44 can be retracted to a position immediately adjacent surface 18 so that its support surface is beneath conveyor 20. When it is desired to have a person available at the discharge side of conveyor 20, platform 44 is moved outwardly from surface 18 to provide an area for such a person to stand.

When a field of crops is to be harvested, harvesting aid 10 is drawn through the field by a tractor at a low speed, for example, a speed in the order of 1 mile per hour. The picking crew walks through the field behind harvesting aid 10, selecting those plants which are ready for harvesting, and cutting the produce therefrom. The produce is placed upon belt conveyors 28 which are wide enough to cover several rows of crops. For example, each conveyor 28 might be 8 feet wide, giving a total span adequate for the simultaneous harvesting of eight or ten rows of crops. Conveyors 28 move the produce toward elevator 30 and deposit each head into a funnel-shaped hopper. Here the produce is picked up by bucket 32 on elevator 30. By way of example, each belt conveyor 28 might move at a speed in the order of 12 feet per minute, and elevator 30 might move at a speed in the order of 90 feet per minute.

Flattened unfilled containers are stored on front platform 38. A crew member standing on lower platform 18 assembles these cartons and places them on roller conveyor 20, on which they are gravity fed toward packing platform 34, as depicted in FIG. 1. The carton assembly can utilize an air gun for stapling the cartons, if needed, with the necessary compressed air supplied by compressor 41.

As each head of produce is brought to platform 34 by elevator 30, the head is deposited onto divider 36. Since the buckets 32 on elevator 30 are staggered across the width of the elevator, the heads of produce will roll alternatively to the left and to the right sides of packing platform 34. Four packers can operate simultaneously at platform 34, two inside roller conveyor 20, and two outside conveyor 20. The two packers on the side of platform 34 upstream with respect to roller conveyor 20 pack a container about one-half full and then push that container on conveyor 20 to the other side of platform 34 where the other two packers complete the packing of it. In practice, one or more partially filled containers are generally on conveyor 20 beneath packing platform 34, thus insuring that the packers on the downstream side of packing platform 34 always have a steady flow of partially filled containers and so do not run out of work.

Should two of the packers work more rapidly than the other two, or should the labor situation necessitate there being an odd number of packers working at platform 34, divider 36 is adjusted by moving handle 46 so that the peak 48 of divider 36 is closer to the slower-working side of platform 34. Consequently, as the heads of produce tumble from buckets 32 onto platform 34, a greater number of heads move to the side away from peak 48. Likewise, if only one packer is available at packing platform 34, handle 46 is moved to adjust divider 36 so that all the heads of produce are diverted to one side of platform 34. Thus, the produce is distributed between the two sides of platform 34 in accordance with the working speed of the packing crew at platform 34.

The filled containers are gravity fed from packing platform 34 toward the downstream end of roller conveyor 20 where another crew member closes the containers. The containers can be nailed or stapled shut, if desired. If only a small field is being harvested, the filled containers might be stored on platform 18, and the crew member closing the containers can stand on telescoping platform 44. If a large field is being harvested, the filled containers can be transferred to a flat-bed trailer being drawn parallel with harvesting aid 10 by another tractor and having a roller conveyor connecting harvesting aid 10 to that flat-bed trailer.

Harvesting aid 10 is capable of utilization with a wide variety of crops. Its ground clearance is high, particularly since there is no continuous axle connecting the two wheels 16. Thus, harvesting aid 10 can be used not only with low crops such as cabbage, but also with taller crops such as cauliflower. The load on harvesting aid 10 is balanced on the wheels 16; however, should additional traction be desired, for example in an extremely wet field, the weight on the tractor drawbar can be increased by shifting the load toward the front of harvesting aid 10, for example by placing packed containers on platform 38.

At the side of each belt conveyor 28 nearest platform 18 a banking board 50 can be provided to permit the picking crew to gently toss heads of produce to conveyor 28. The banking boards 50 are preferably hinged to conveyors 28.

Preferably harvesting aid 10 is drawn by means of a tractor having a hydrostatic drive to permit travel at speeds less than one-half miles per hour. However, if this type of drive is not available a signal bell with a pushbutton located on the outer side of each belt conveyor 28 can be utilized to signal the tractor driver to start and to stop.

Divider 36 might be formed of a pipe frame having a sheet of rubberized belt material stretched over it. The rubberized belt material, similar to that on belt conveyors 28, prevents damage to any heads of produce which drop from buckets 32 onto the peak 48 of divider 36. The pipe frame might be rotatable about its lower horizontal pipe in response to movement of handle 46 to adjust the location of the divider peak 48. Alternatively, the pipe frame might be rotatable about its inner most vertical pipe in response to movement of handle 46, thus swinging its outer end from side-to-side to cause adjustment of the divider. Other divider configurations permitting ready adjustment might also be utilized.

Throughout the entire harvesting operation the harvesting crew is concentrated in a very small area. This permits supervision of the entire crew by one individual. Preferably the supervisor can work as one of the packers at packing platform 34. This places him in a position to see the entire operation. Should a problem arise, he can leave his packing station to take corrective action, and by adjustment of divider 36 the remaining members of the packing crew can divide the heads of produce between them in an appropriate manner. Additionally, while working as a packer, the supervisor is in a position to perform final inspection not only of the crop quality, but also of the container assembly and of the performance of the remainder of the packing crew. Further, by locating an electrical control panel adjacent packing platform 34, the supervisor is in a position to control belt conveyor 28, elevator 30, the lights and the air compressor.

When it is desired to store or to transport harvesting aid 10 to another field, telescoping platform 44 is moved inward, banking boards 50 are folded downward, and belt conveyors 28 are folded upward as indicated by arrows 52 to the position shown in broken lines in FIG. 3. This narrows harvesting aid 10 for transportation over a public roadway. To turn around within a field, one of the belt conveyors 28 might be raised, thereby decreasing the turning radius.

Utilizing harvesting aid 10, a moderate sized crew can harvest a large field in a short time. Thus, for example, a crew of 15 persons can pack an average of three 50 pound crates per minute throughout the day, including loading empty cartons, assembling these cartons, cutting and grading the crop, packing heads into cartons, closing the cartons, and transferring the closed cartons to trucks. Since no heavy lifting is required of the crew, even elderly and partially handicapped persons can be utilized. Crop losses from bruising are substantially eliminated.

We claim:

1. A crop-harvesting aid comprising a platform member including drawbar means for attaching the crop-harvesting aid to a vehicle to be towed thereby and a pair of wheels; first and second continuous conveyors, each having an outlet; means rotatably connecting the first and second continuous conveyors to the platform member adjacent the outlet of each of the first and second continuous conveyors and permitting rotation of each of the first and second continuous conveyors between a substantially horizontally disposed crop-conveying position and a substantially vertically disposed transporting position; means defining first and second crop-loading stations connected to the platform member and elevated with respect to the outlet of each of the first and second continuous conveyors; crop elevating and distributing means for elevating crops from the outlet of each of the first and second continuous conveyors and distributing the crops between the first and second loading stations in accordance with a preset ratio, the crop elevating and distributing means including:

a. inclined endless belt means having an inlet end adjacent the outlet of each of the first and second continuous conveyors and adapted to receive crops therefrom, having a discharge end, having a plurality of crop-carrying bucket means distributed over the length thereof and laterally positioned at varying locations across the width thereof, and having drive means for driving the inclined endless belt means to elevate the plurality of crop-carrying bucket means; and b. crop distributor means adjacent the inclined endless belt means discharge end and adapted to receive crops therefrom and including a substantially vertically disposed divider member adjustably connected adjacent the inclined endless belt means discharge end for smooth adjustment between a first extreme position in which all crops received by the crop distributor means from the inclined endless belt means discharge end are directed to the first crop-loading station and a second extreme position in which all crops received by the crop distributor means from the inclined endless belt means discharge end are directed to the second crop-loading station, and cooperating with the lateral positioning of the crop-carrying buckets to distribute crops between the first and second loading stations in accordance with a preset ratio as crops are received by the crop-distributing means from the inclined endless belt means discharge end; and a third continuous conveyor passing adjacent the first and second crop-loading stations and the platform member periphery and adapted to convey empty containers toward the first and second crop-loading stations to convey filled containers from the first and second crop-loading stations.

2. A crop-harvesting aid as claimed in claim 1 in which the third continuous conveyor is a roller conveyor including telescoping support means permitting the elevating of either end thereof to convey containers under the urging of gravity in either longitudinal direction thereon.

3. A crop-harvesting aid as claimed in claim 1 further comprising a support platform and means telescopingly connecting the support platform to the platform member alternatively in a retracted storage position in which the support platform is beneath the platform member and in an extended work position in which the support platform is adjacent the platform member.

4. A crop-harvesting aid as claimed in claim 1 in which the platform member includes a first platform area adjacent the first and second crop-loading stations, and a second platform area removed from the first and second crop-loading stations and adjacent the ends of the third continuous conveyor and elevated with respect to the first platform area.

5. A crop-harvesting aid as claimed in claim 1 in which the first and second continuous conveyor each include a banking board along one side thereof for deflecting to the associated continuous conveyor crops tossed thereagainst.

6. A crop-harvesting aid as claimed in claim 1 further comprising stapling means for stapling containers, lights for illuminating the crop-harvesting aid and surrounding area, and a source of power for the stapling means and the lights.

UNITED STATES PATENT OFFICE
CERTIFICATE OF CORRECTION

Patent No. 3,599,395          Dated August 17, 1971

Inventor(s) Joseph Rodriguez et al.

It is certified that error appears in the above-identified patent and that said Letters Patent are hereby corrected as shown below:

Column 2, Line 29, "electrical" should read --inclined--.

Column 2, Line 48, "if" should be inserted before --desired--.

Column 3, Line 11, "alternatively" should read --alternately--.

Column 3, Line 63, "to", second occurrence, should read -- onto --.

Signed and sealed this 15th day of February 1972.

(SEAL)
Attest:

EDWARD M. FLETCHER, JR.          ROBERT GOTTSCHALK
Attesting Officer                Commissioner of Patents